United States Patent
Adachi

(10) Patent No.: US 9,473,656 B2
(45) Date of Patent: Oct. 18, 2016

(54) IMAGE PROCESSING APPARATUS, AND METHOD AND COMPUTER-READABLE MEDIUM FOR THE SAME INCLUDING REGISTRATION AND DOCUMENT PRESENCE FEATURES

(71) Applicant: BROTHER KOGYO KABUSHIKI KAISHA, Nagoya-shi, Aichi-ken (JP)

(72) Inventor: Toyoshi Adachi, Kakamigahara (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/747,424

(22) Filed: Jun. 23, 2015

(65) Prior Publication Data

US 2015/0381839 A1   Dec. 31, 2015

(30) Foreign Application Priority Data

Jun. 25, 2014   (JP) .................................. 2014-130640

(51) Int. Cl.
H04N 1/00        (2006.01)
H04N 1/32        (2006.01)

(52) U.S. Cl.
CPC ........ H04N 1/00811 (2013.01); H04N 1/0097 (2013.01); H04N 1/00225 (2013.01); H04N 1/32138 (2013.01); H04N 1/00326 (2013.01); H04N 1/00689 (2013.01)

(58) Field of Classification Search
None
See application file for complete search history.

(56) References Cited

U.S. PATENT DOCUMENTS 6,008,727 A    12/1999   Want et al.
6,176,425 B1   1/2001    Harrison et al.
(Continued)

FOREIGN PATENT DOCUMENTS

EP    2182714 A1        5/2010
JP    EP 0886428 A2 *   12/1998   ........... H04N 1/0035
(Continued)

OTHER PUBLICATIONS

Extended European Search Report issued in European Application No. 15173672.5, mailed Oct. 29, 2015.

*Primary Examiner* — Thomas D Lee
(74) *Attorney, Agent, or Firm* — Merchant & Gould P.C.

(57) ABSTRACT

An image processing apparatus including a sensor detecting a document set on the image processing apparatus, an image processing device performing an image processing operation for the document, a reader reading registration information from a recording medium, the registration information including at least one of identification information and setting information, and a controller configured to, in response to the recording medium being brought in proximity to or in contact with the reader, control the reader to read the registration information from the recording medium, acquire the setting information based on the registration information, determine whether the document is set on the image processing apparatus, based on a detection signal from the sensor, and in response to determining that the document is set on the image processing apparatus, control the image processing device to perform the image processing operation in accordance with the setting information.

18 Claims, 14 Drawing Sheets

(56) References Cited

U.S. PATENT DOCUMENTS

| | | |
|---|---|---|
| 6,249,226 B1 | 6/2001 | Harrison et al. |
| 6,340,931 B1 | 1/2002 | Harrison et al. |
| 6,342,830 B1 | 1/2002 | Want et al. |
| 6,446,208 B1 | 9/2002 | Gujar et al. |
| 6,827,279 B2 | 12/2004 | Teraura |
| 2004/0257601 A1 | 12/2004 | Tomiyasu et al. |
| 2005/0055235 A1 | 3/2005 | Mizuki et al. |
| 2005/0080844 A1 | 4/2005 | Dathathraya et al. |
| 2015/0138597 A1* | 5/2015 | Koshigaya ......... H04N 1/00973 358/1.15 |

FOREIGN PATENT DOCUMENTS

| | | |
|---|---|---|
| JP | 2000-187715 A | 7/2000 |
| JP | 2005-084916 A | 3/2005 |
| JP | 2008-022183 A | 1/2008 |

* cited by examiner

16 →  
The card "Scan#11" has been  
brought close to the card reader.  
Image scanning is going to be performed.

Destination: taro.ito@○○○.com  
Resolution: 300dpi  
Color: YES  
File Format: PDF

16 →  
The card "Scan#11" has been  
brought close to the card reader.  
Image scanning will be performed  
with the following setting values.

Destination: taro.ito@○○○.com  
Resolution: 300dpi  
Color: YES  
File Format: PDF Image scanning will be started  
after the document is set.

16 →  
The card "Scan#11" has been  
brought close to the card reader.  
Image scanning will be performed  
with the following setting values.  
Please press Start button  
after setting the document.

Destination: taro.ito@○○○.com  
Resolution: 300dpi  
Color: Gray  
File Format: PDF  
OnePush: ON

[ Start ]

IMAGE PROCESSING APPARATUS, AND METHOD AND COMPUTER-READABLE MEDIUM FOR THE SAME INCLUDING REGISTRATION AND DOCUMENT PRESENCE FEATURES

CROSS-REFERENCE TO RELATED APPLICATION

This application claims priority under 35 U.S.C. §119 from Japanese Patent Application No. 2014-130640 filed on Jun. 25, 2014. The entire subject matter of the application is incorporated herein by reference.

BACKGROUND

1. Technical Field

The following description relates to one or more aspects of an image processing apparatus configured to perform an image processing operation.

2. Related Art

An image scanner has been known that provides a shortcut function for simplifying user operations. The shortcut function is such a function as to execute a corresponding operation in accordance with setting information, for instance, in response to acceptance of an operation for selecting a specific one of shortcut buttons. The specific shortcut button is associated with the corresponding operation and the setting information required for execution of the corresponding operation.

SUMMARY

According to aspects of the present disclosure, an image processing apparatus is provided, which includes a sensor configured to detect a document set on the image processing apparatus, an image processing device configured to perform an image processing operation of processing an image of the document, a reader configured to read registration information from a recording medium positioned in proximity to or in contact with the reader, the registration information including at least one of identification information for the recording medium and setting information for the image processing operation, and a controller configured to, in response to the recording medium being brought in proximity to or in contact with the reader, control the reader to read the registration information from the recording medium, in response to the registration information being read by the reader, acquire the setting information based on the read registration information, in response to acquiring the setting information, determine whether the document is set on the image processing apparatus, based on a detection signal from the sensor, and in response to determining that the document is set on the image processing apparatus, control the image processing device to perform the image processing operation in accordance with the acquired setting information.

According to aspects of the present disclosure, further provided is a method adapted to be implemented on a processor coupled with an image processing apparatus comprising a sensor, an image processing device, and a reader, the method including, in response to a recording medium being brought in proximity to or in contact with the reader, controlling the reader to read registration information from the recording medium via near-field wireless communication, the registration information including at least one of identification information for the recording medium and setting information for an image processing operation performed by the image processing device, in response to the registration information being read by the reader, acquiring the setting information based on the read registration information, in response to acquiring the setting information, determining whether a document is set on the image processing apparatus, based on a detection signal from the sensor configured to detect the document set on the image processing apparatus, and in response to determining that the document is set on the image processing apparatus, controlling the image processing device to perform the image processing operation of processing an image of the document in accordance with the acquired setting information.

According to aspects of the present disclosure, further provided is a non-transitory computer-readable medium storing computer-readable instructions that are executable by a processor coupled with an image processing apparatus comprising a sensor, an image processing device, and a reader, the instructions being configured to, when executed by the processor, cause the processor to, in response to a recording medium being brought in proximity to or in contact with the reader, control the reader to read registration information from the recording medium via near-field wireless communication, the registration information including at least one of identification information for the recording medium and setting information for an image processing operation performed by the image processing device, in response to the registration information being read by the reader, acquire the setting information based on the read registration information, in response to acquiring the setting information, determine whether a document is set on the image processing apparatus, based on a detection signal from the sensor configured to detect the document set on the image processing apparatus, and in response to determining that the document is set on the image processing apparatus, controlling the image processing device to perform the image processing operation of processing an image of the document in accordance with the acquired setting information.

BRIEF DESCRIPTION OF THE ACCOMPANYING DRAWINGS

FIG. 1 is a block diagram showing a configuration of a communication system in a first illustrative embodiment according to one or more aspects of the present disclosure.

FIG. 2 exemplifies a registration screen displayed on a display of an image scanner included in the communication system in the first illustrative embodiment according to one or more aspects of the present disclosure.

FIG. 3 exemplifies a selection screen displayed on the display of the image scanner in the first illustrative embodiment according to one or more aspects of the present disclosure.

FIG. 4 exemplifies a card waiting screen displayed on the display of the image scanner in the first illustrative embodiment according to one or more aspects of the present disclosure.

FIG. 5 exemplifies a confirmation screen displayed on the display of the image scanner in the first illustrative embodiment according to one or more aspects of the present disclosure.

FIG. 6 exemplifies a shortcut button selection screen displayed on the display of the image scanner in the first illustrative embodiment according to one or more aspects of the present disclosure.

FIG. 7 exemplifies a first notification screen displayed on the display of the image scanner in the first illustrative embodiment according to one or more aspects of the present disclosure.

FIG. 8 exemplifies a second notification screen displayed on the display of the image scanner in the first illustrative embodiment according to one or more aspects of the present disclosure.

FIG. 9 exemplifies a third notification screen displayed on the display of the image scanner in the first illustrative embodiment according to one or more aspects of the present disclosure.

Figure 16:
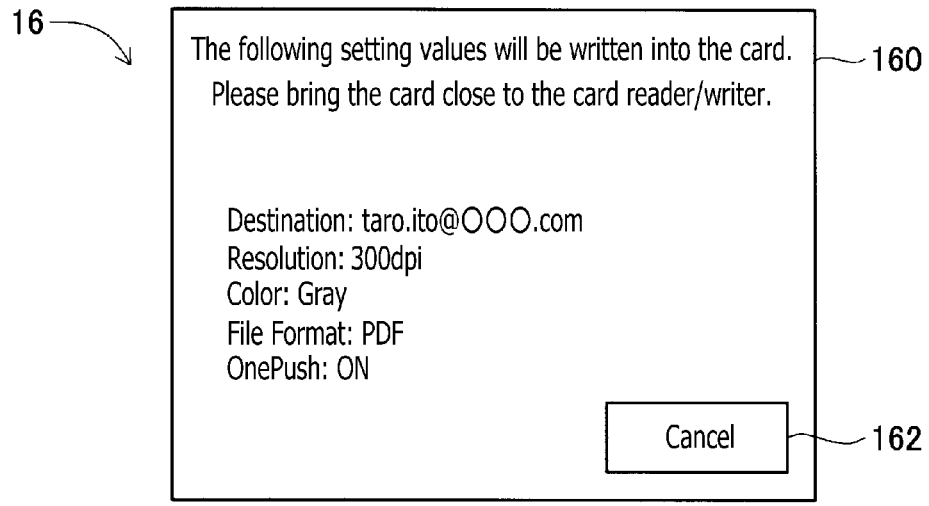

FIG. 16 exemplifies a card waiting screen displayed on a display of the image scanner in the second illustrative embodiment according to one or more aspects of the present disclosure.

Figure 17:
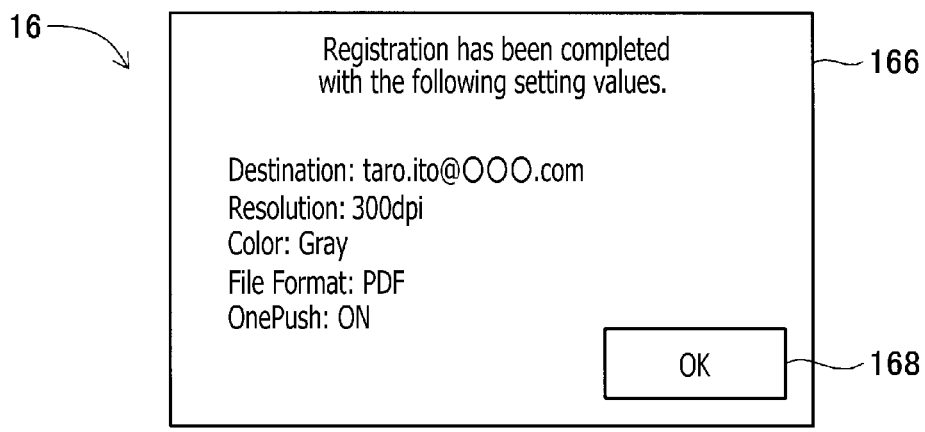

FIG. 17 exemplifies a confirmation screen displayed on the display of the image scanner in the second illustrative embodiment according to one or more aspects of the present disclosure.

Figure 18:
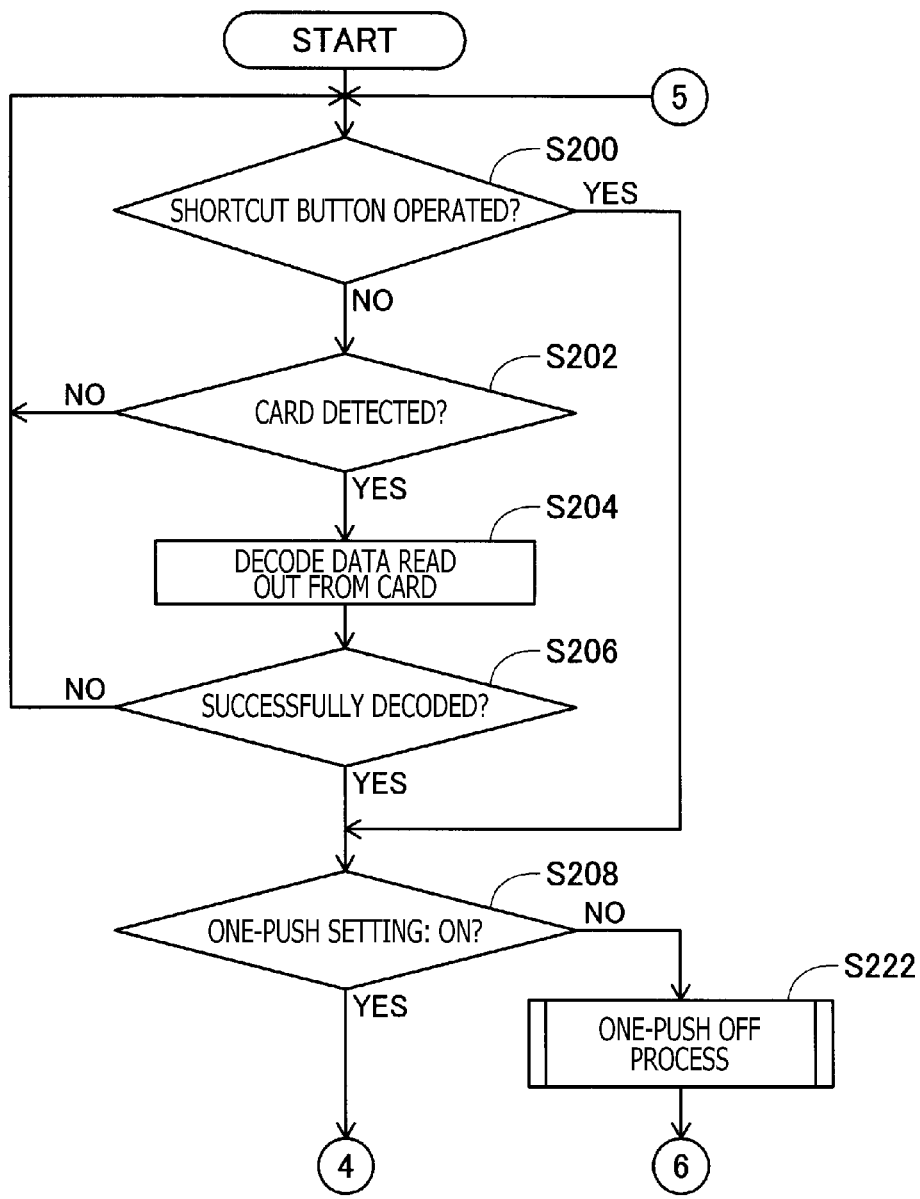
Figure 19:
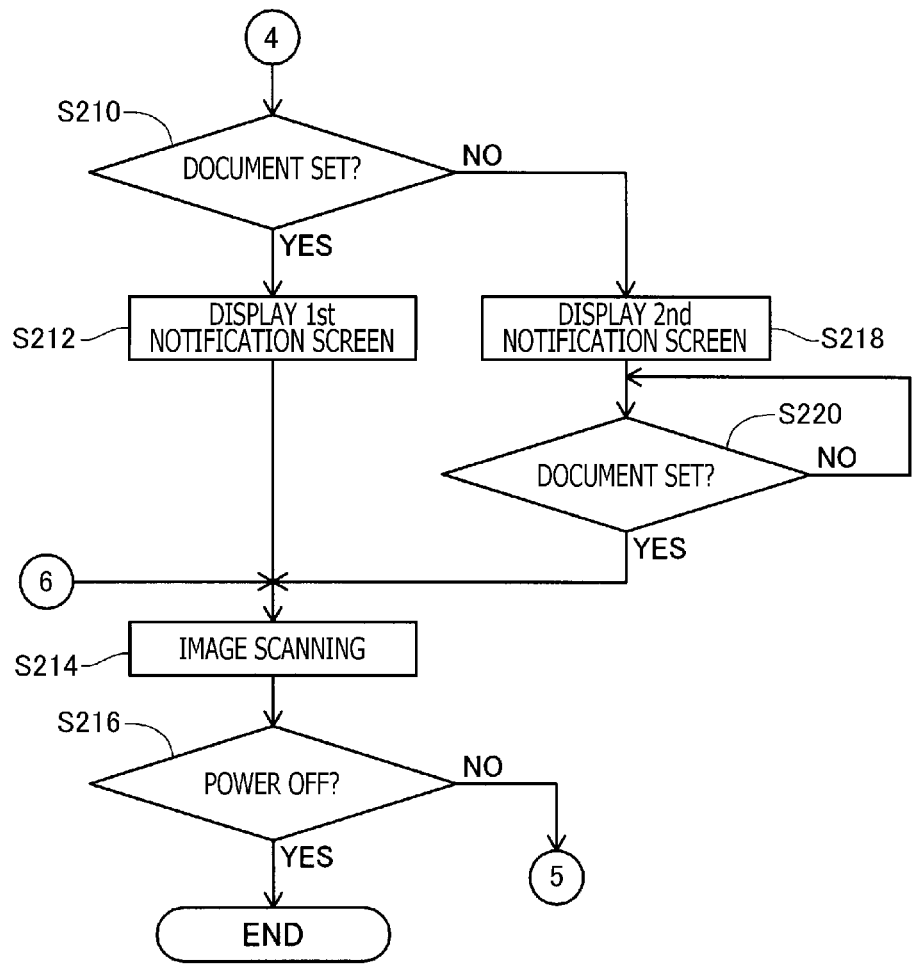
Figure 20:
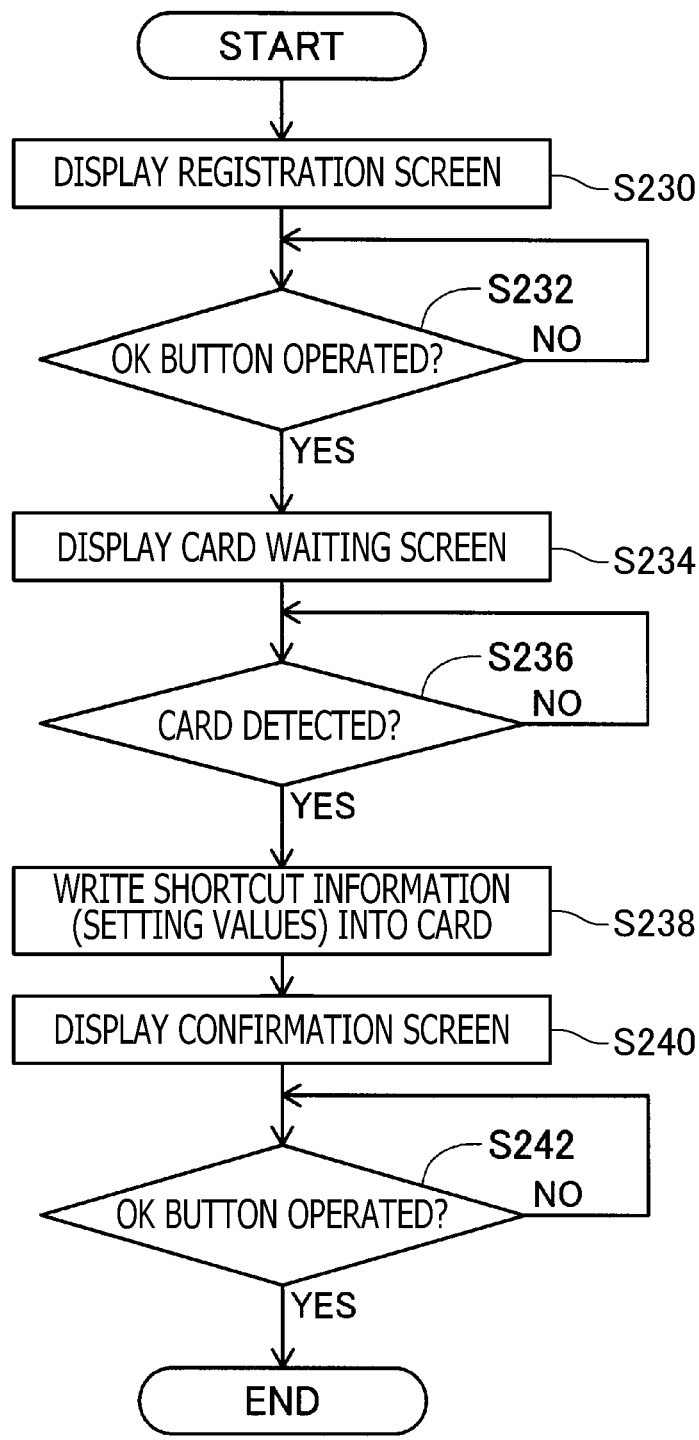

FIGS. 18 to 20 are flowcharts showing a procedure of a process to be performed when a first control program is executed by a CPU of an image scanner in a third illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

According to a known image scanner, it is possible to simplify user operations by using a shortcut function. Nonetheless, there may be users who feel like it is troublesome to search for and operate an intended shortcut button. Therefore, it is desired to further simplify user operations. Aspects of the present disclosure are advantageous to provide one or more improved techniques, for an image processing apparatus, which make it possible to further simplify user operations.

An image processing apparatus according to aspects of the present disclosure includes a reader configured to read registration information from a recording medium positioned in proximity to or in contact with the reader, the registration information including at least one of identification information for the recording medium and setting information for an image processing operation. In the image processing apparatus, when the recording medium is brought in proximity to or in contact with the reader, a sequence is performed that includes reading, by the reader, the registration information from the recording medium, acquiring the setting information based on the read registration information, determining whether a document is set on the image processing apparatus, based on a detection signal from a sensor, and in response to determining that the document is set on the image processing apparatus, performing the image processing operation in accordance with the acquired setting information. Thus, in the image processing apparatus according to aspects of the present disclosure, in response to the recording medium being brought in proximity to or in contact with the reader, the image processing operation is performed in accordance with the acquired setting information when it is determined that the document is set on the image processing apparatus. Thereby, it is possible to achieve an image processing apparatus configured to perform an image processing operation via more simplified user operations.

Hereinafter, illustrative embodiments according to aspects of the present disclosure will be described with reference to the accompanying drawings.

First Illustrative Embodiment

Figure 1:
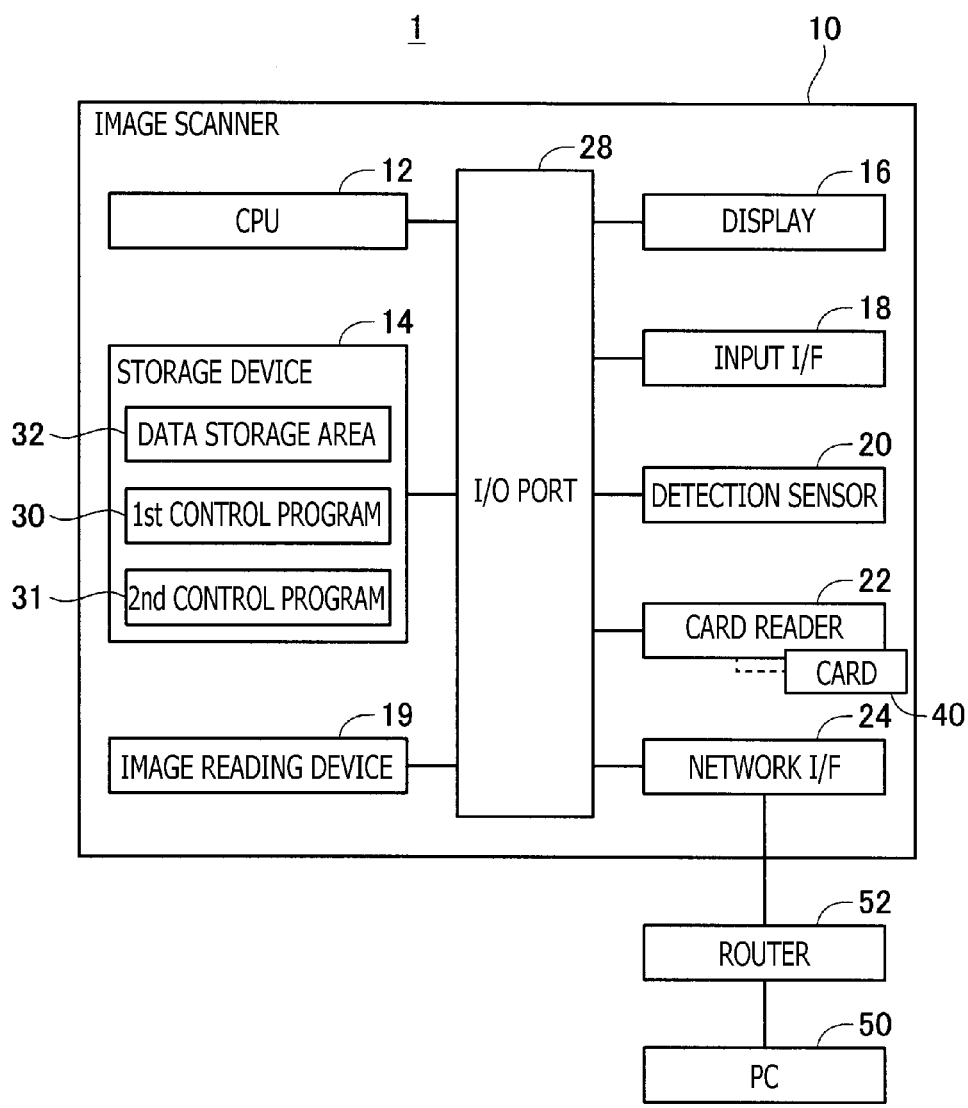

As shown in FIG. 1, a communication system 1 includes an image scanner 10, a personal computer (hereinafter referred to as a "PC" in an abbreviation form) 50, and a router 52. It is noted that the image scanner 10 is an example of an image processing apparatus according to aspects of the present disclosure.

The image scanner 10 is configured to scan a document set on an automatic document feeder (hereinafter referred to as an "ADF") (not shown) and generate scanned data. Namely, the image scanner 10 is a sheet feed scanner. The image scanner 10 includes a central processing unit (hereinafter referred to as a "CPU") 12, a storage device 14, a display 16, an input interface (hereinafter referred to as an "input I/F") 18, an image reading device 19, a detection sensor 20, a card reader 22, and a network interface (hereinafter referred to as a "network I/F") 24. These elements included in the image scanner 10 are communicably connected with each other via an input/output port (hereinafter referred to as an I/O port") 28. The display 16 is an example of a display according to aspects of the present disclosure. The input I/F 18 is an example of an operation device according to aspects of the present disclosure. The detection sensor 20 is an example of a sensor according to aspects of the present disclosure. The card reader 22 is an example of a reader according to aspects of the present disclosure.

The CPU 12 is configured to execute operations in accordance with a first control program 30 and a second control program 31 stored in the storage device 14. It is noted that the storage device 14 is an example of a non-transitory computer-readable medium according to aspects of the present disclosure. The first control program 30 is a program for executing an image scanning operation and transmitting to the PC 50 scanned data generated in the image scanning operation. The second control program 31 is a program for registering a card and a shortcut button to be used for the image scanning operation. It is noted that the CPU 12 executing the control programs 30 and 31 may simply be referred to as the names of the programs. For instance, in the following description, "the control programs 30 and 31" may represent "the CPU 12 executing the control programs 30 and 31."

The storage device 14 includes a data storage area 32 configured to store data necessary for execution of the first control program 30. The storage device 14 is formed by a combination of storage devices such as a random access memory (hereinafter referred to as a "RAM"), a read only memory (hereinafter referred to as a "ROM"), a flash memory, a hard disk drive (hereinafter referred to as an "HDD"), and a buffer provided to the CPU 12.

The display 16 has a display surface configured to display various functions of the image scanner 10. For instance, a liquid crystal display (hereinafter referred to as an "LCD"), an organic electroluminescence display (hereinafter referred to as an "OELD"), and a plasma display can be cited as examples of the display 16. The input I/F 18 is configured to accept user operations to buttons displayed on the display 16. For instance, the input I/F 18 may include a touch panel configured integrally with the display 16. Further, for instance, the input I/F 18 may include hard keys. The image reading device 19 is configured to read an image of a document. For instance, the image reading device 19 includes a plurality of conveyance rollers and an image sensor (such as a CCD image sensor or a contact image sensor). The plurality of conveyance rollers are driven by a motor. The image sensor is configured to read a document sheet being conveyed by the plurality of conveyance rollers. The image scanner 10 may be a flatbed scanner. In this case, the image reading device 19 may include a moving mechanism configured to move the image sensor in a sub scanning direction, in addition to or instead of the plurality of conveyance rollers. The detection sensor 20 is configured to detect whether there is a document set on the ADF of the image scanner 10. For instance, the detection sensor 20 includes a light emitting element configured to emit light and a light receiving element configured to receive the light from the light emitting element. When there is a document set on the ADF of the image scanner 10, the light from the light emitting element is blocked by the document. Thereby, a light receiving quantity of the light receiving element (i.e., a quantity of light received by the light receiving element) is changed. Thus, it is possible for the detection sensor 20 to detect whether there is a document set on the ADF of the image scanner 10. Alternatively, the detection sensor 20 may include a rotatable member configured to be rotated by a document set on the ADF, and a photo-coupler configured to detect a position of the rotatable member.

The card reader 22 is configured to, in response to a card 40 with an IC chip incorporated therein being brought in proximity to or in contact with the card reader 22, read a production number of the card 40 that is stored in the IC chip, via a near-field wireless communication. It is noted that the card 40 is an example of a recording medium according to aspects of the present disclosure. Further, the production number of the card 40 is an example of identification information according to aspects of the present disclosure.

The network I/F 24 is configured to communicate with an external device via the router 52. The network I/F 24 is connected with the PC 50 via the router 52. Thereby, the image scanner 10 is allowed to perform data communication with the PC 50.

<Image Scanning Operation in Communication System>

Figure 2:
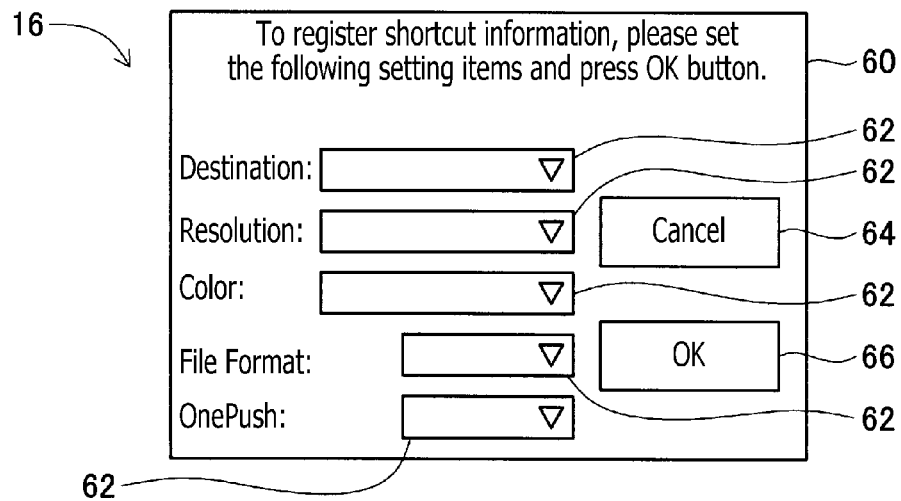

In the communication system 1, it is possible to perform an image scanning operation using the card 40 by the image scanner 10, and to transmit scanned data generated in the image scanning operation to the PC 50. Specifically, in the image scanner 10, firstly, the card 40 is registered. In the image scanner 10, when a button (not shown) for registering the card 40 is operated, a registration screen 60 is displayed on the display 16, as shown in FIG. 2. On the registration screen, a plurality of entry fields 62, a cancel button 64, and an OK button 66 are displayed. Each entry field 62 is configured to accept an entry of a corresponding piece of shortcut information associated with the card 40 to be registered. It is noted that the shortcut information is an example of setting information according to aspects of the present disclosure.

The shortcut information is required to use the shortcut function in the image scanning operation. The shortcut information includes information on a transmission destination of the scanned data to be generated in the image scanning operation, information on a resolution for the image scanning operation, information for specifying one of monochrome scanning and color scanning, information on a file format of the scanned data to be generated in the image scanning operation, and information on a one-push setting. Each piece of information included in the shortcut information is input in a corresponding one of the entry fields 62. It is noted that the one-push setting is a setting for starting the image scanning operation in response to a simple operation. When the one-push setting is set ON, the image scanning operation is started in response to a simple operation. Meanwhile, when the one-push setting is set OFF, the image scanning operation is started after a user operation for reconfirmation.

Figure 3:
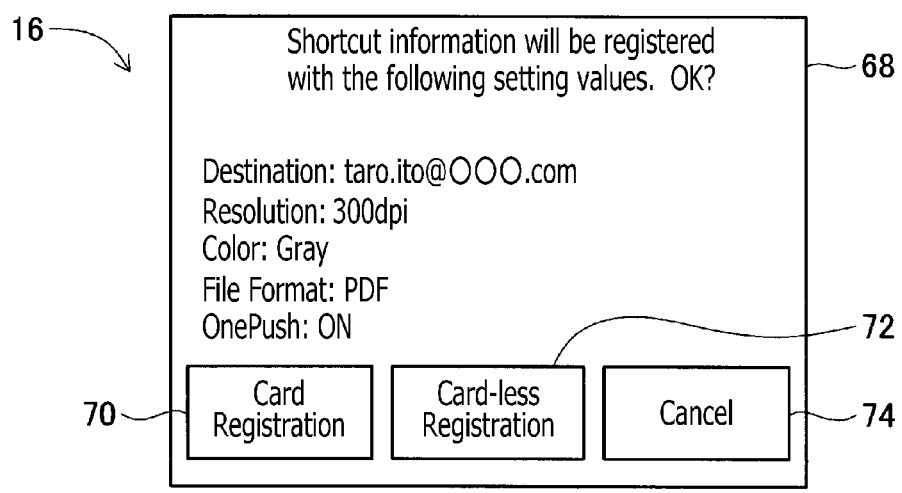

When the OK button 66 is operated after the shortcut information has been input in the entry fields 62, a selection screen 68 is displayed on the display 16, as shown in FIG. 3. On the selection screen 68, the shortcut information input in the entry fields 62 on the registration screen 60 is displayed for user confirmation. Additionally, on the selection screen 68, a card registration button 70, a card-less registration button 72, and a cancel button 74 are displayed. The card registration button 70 is a button for registering the card 40 for executing the image scanning operation. The card-less registration button 72 is a button for registering shortcut information for executing the image scanning operation using a shortcut button instead of the card 40.

Figure 4:
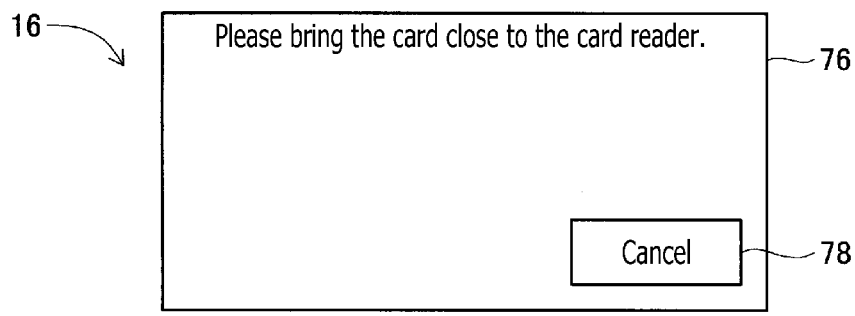
Figure 5:
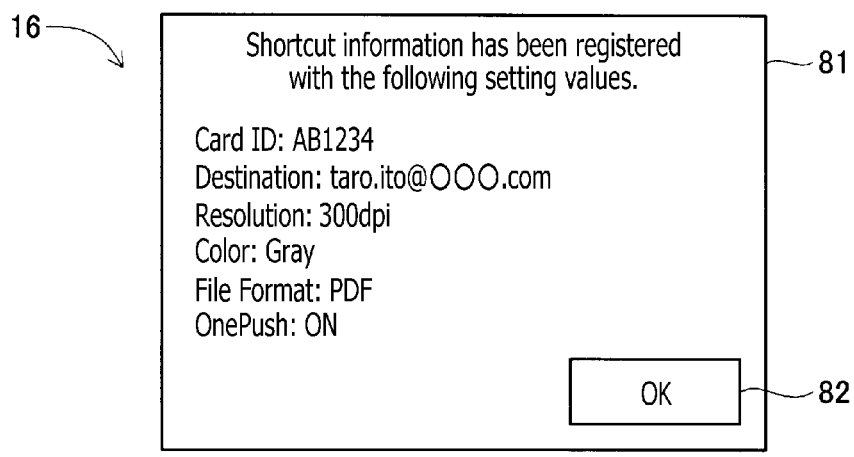

When the card registration button 70 is operated on the selection screen 68, a card waiting screen 76 is displayed on the display 16, as shown in FIG. 4. On the card waiting screen 76, a message that prompts the user to bring the card 40 in proximity to or in contact with the card reader 22, and a cancel button 78 are displayed, as shown in FIG. 4. The user confirms the message on the card waiting screen 76 and then brings the card 40 to be registered in proximity to or in contact with the card reader 22. Thereby, the production number of the card 40 to be registered is read by the card reader 22. The production number of the card 40 is stored into the data storage area 32 in association with the shortcut information input in the entry fields 62 on the registration screen 60. After the production number and the shortcut information are stored into the data storage area 32 in association with each other, a confirmation screen 81 is displayed on the display 16, as shown in FIG. 5. On the confirmation screen 81, the registered production number of the card 40, the registered shortcut information, and an OK button 82 are displayed. When the OK button 82 is operated, the registration of the card 40 is completed.

Figure 6:
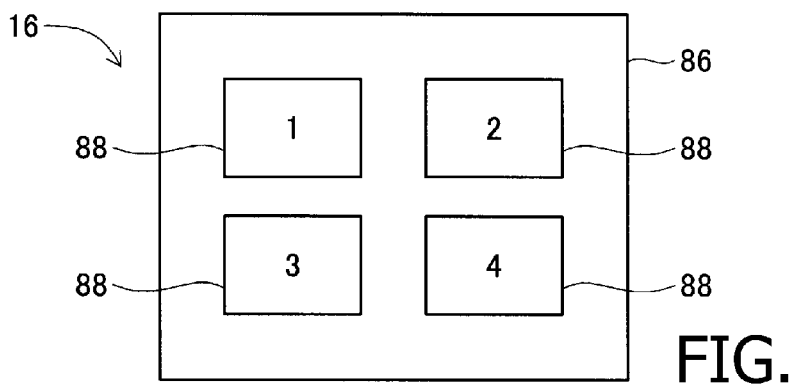

When the card-less registration button 72 is operated on the selection screen 68, shortcut information for executing the image scanning operation using a shortcut button is registered. Specifically, when the card-less registration button 72 is operated on the selection screen 68, a shortcut button selection screen 86 is displayed on the display 16, as shown in FIG. 6. On the shortcut button selection screen 86, a plurality of shortcut buttons 88 are displayed. When the user selects one of the shortcut buttons 88, information on the selected shortcut button 88 and the shortcut information input in the entry fields 62 on the registration screen 60 are stored into the data storage area 32 in association with each other. Thereafter, on the display 16, a screen (not shown) is displayed for confirming the shortcut information stored in association with the selected shortcut button 88. Thereby, the registration of the shortcut information in association with the selected shortcut button 88 is completed.

When the registration of the card 40 or the registration of the shortcut information associated with the selected shortcut button 88 is completed, it becomes possible to execute the image scanning operation using the registered card 40 or the registered shortcut button 88. Specifically, when the user brings the registered card 40 in proximity to or in contact with the card reader 22, the production number of the card 40 is read by the card reader 22. Then, the image scanner 10 extracts the shortcut information that is stored in the data storage area 32 in association with the read production number of the card 40. According to the extracted shortcut information, the image scanner 10 performs the image scanning operation. Meanwhile, when the user selects the registered shortcut button 88, the image scanner 10 extracts the shortcut information that is stored in the data storage area 32 in association with the selected shortcut button 88. According to the extracted shortcut information, the image scanner 10 performs the image scanning operation.

When there is not any document set on the ADF, it is not possible to perform the image scanning operation. Hence, the image scanner 10 determines whether there is a document set on the ADF, based on a detection value from the detection sensor 20. Further, as described above, the shortcut information includes the information on the one-push setting. When the one-push setting is set ON, the image scanning operation is started in response to a simple operation. Meanwhile, when the one-push setting is set OFF, a user operation for reconfirmation is required to start the image scanning operation. When there is a document set on the ADF, and the one-push setting included in the extracted shortcut information is set ON, the image scanning operation is performed in response to the registered card 40 being just brought in proximity to or in contact with the card reader 22.

In the image scanning operation, the image scanner 10 scans the document and generates scanned data in accordance with the information included in the extracted shortcut information, such as the information on the resolution for the image scanning operation, the information for specifying one of monochrome scanning and color scanning, and the information on the file format of the scanned data. Then, the image scanner 10 transmits the scanned data, e.g., to the PC 50 via the network I/F 24, based on the information on the transmission destination that is included in the extracted shortcut information. When the image scanning operation is executed in accordance with the aforementioned procedure, a first notification screen 100 is displayed on the display 16, as shown in FIG. 7. The first notification screen 100 displays thereon the shortcut information for the image scanning operation to be executed and a message notifying that the image scanning operation using the card 40 is about to be executed.

When the shortcut information associated with the production number of the card 40 is extracted, in a case where the one-push setting included in the extracted shortcut information is set ON, and there is not any document set on the ADF, a second notification screen 102 is displayed on the display 16, as shown in FIG. 8. The second notification screen 102 displays thereon a message notifying that the registered card 40 has been detected and the shortcut information associated with the card 40 (i.e., the shortcut information for the image scanning operation using the card 40). The user is allowed to confirm the shortcut information for the image scanning operation using the card 40. For instance, when the user forgets settings for the image scanning operation using the card 40, the user is allowed to make sure of the settings for the image scanning operation using the card 40, by intentionally not setting any document on the ADF and bringing the card 40 in proximity to or in contact with the card reader 22.

The second notification screen 102 also displays thereon a message that the image scanning operation will be executed immediately after a document is set on the ADF. When the user sets a document on the ADF in a state where the second notification screen 102 is displayed on the display 16, the image scanning operation is executed in accordance with the extracted shortcut information. Scanned data generated in the image scanning operation is transmitted to the transmission destination included in the extracted shortcut information. Thereby, after making sure of the shortcut information, the user is allowed to conveniently execute the image scanning operation without having to operate any buttons.

When the shortcut information associated with the production number of the card 40 is extracted, in a case where the one-push setting included in the extracted shortcut information is set OFF, a third notification screen 106 is displayed on the display 16, as shown in FIG. 9, regardless of whether there is a document set on the ADF. The third notification screen 106 displays thereon the shortcut information associated with the card 40 (i.e., the shortcut information for the image scanning operation using the card 40). The third notification screen 106 also displays thereon a start button 108 and a message notifying that the image scanning operation is executed in accordance with the displayed shortcut information when the user operates the start button 108 after setting a document on the ADF. When the user operates the start button 108, the image scanning operation is executed in accordance with the extracted shortcut information. Scanned data generated in the image scanning operation is transmitted to the transmission destination included in the extracted shortcut information. After the user brings the card 40 in proximity to or in contact with the card reader 22, the image scanning operation is executed in response to the user confirming the shortcut information and performing a user operation after confirmation. Thereby, it is possible to certainly make sure of user's intentions, to prevent the image scanning operation from being executed despite user's intentions, and to prevent the scanned data from being mistakenly transmitted.

When the registered shortcut button 88 is operated, the image scanning operation is executed in the same manner as when the registered card 40 is brought in proximity to or in contact with the card reader 22. When the shortcut button 88 is operated, the shortcut information associated with the shortcut button 88 is extracted. Subsequently, it is determined whether there is a document set on the ADF. Further, it is determined whether the one-push setting included in the extracted shortcut information is set ON. When it is determined that there is a document set on the ADF and that the one-push setting included in the extracted shortcut information is set ON, the image scanning operation is executed. Namely, when a document is set on the ADF, and the one-push setting included in the extracted shortcut information is set ON, the image scanning operation is executed in response to the shortcut button 88 being just operated. Since the image scanning operation to be executed in response to the shortcut button 88 being operated is substantially the same as the image scanning operation using the card 40, a detailed explanation thereof will be omitted. When the image scanning operation is executed in response to the shortcut button 88 being operated, a screen that is similar to the first notification screen 100 shown in FIG. 7 is displayed on the display 16. On the screen, a message "The shortcut button #X has been operated." is displayed instead of a message "The card of Scan#11 has been brought in proximity to the card reader." on the first notification screen 100.

When the shortcut information is extracted in response to the shortcut button 88 being operated, in a case where the one-push setting included in the extracted shortcut information is set ON, and there is not any document set on the ADF, a screen similar to the second notification screen 102 shown in FIG. 8 is displayed on the display 16. On the screen, a message "The shortcut button #X has been operated." is displayed instead of a message "The card of Scan#11 has been brought in proximity to the card reader." on the second notification screen 102. Thereby, in the same manner as when the image scanning operation is executed using the card 40, for instance, when the user forgets information associated with the shortcut button 88, the user is allowed to make sure of the information associated with the shortcut button 88, by intentionally not setting any document on the ADF and operating the shortcut button 88. When the user sets a document on the ADF in accordance with a message displayed on the screen, the image scanning operation is executed. Thereby, after making sure of the shortcut information on the screen similar to the second notification screen 102, the user is allowed to conveniently execute the image scanning operation without having to operate any buttons.

When the shortcut information is extracted in response to the shortcut button 88 being operated, in a case where the one-push setting included in the extracted shortcut information is set OFF, a screen similar to the third notification screen 106 shown in FIG. 9 is displayed on the display 16, regardless of whether there is a document set on the ADF. On the screen, a message "The shortcut button #X has been operated." is displayed instead of a message "The card of Scan#11 has been brought in proximity to the card reader." on the third notification screen 106. On the screen, in the same manner as on the third notification screen 106, when a start button 108 is operated, the image scanning operation is executed in accordance with the extracted shortcut information. After the user operates the shortcut button 88, the image scanning operation is executed in response to the user confirming the shortcut information and performing a user operation after confirmation. Thereby, it is possible to certainly make sure of user's intentions, to prevent the image scanning operation from being executed despite user's intentions, and to prevent the scanned data from being mistakenly transmitted.

<Control Programs>

The aforementioned image scanning operation is performed when the first control program 30 is executed by the CPU 12 of the image scanner 10. Further, the registration of the card 40 and the shortcut button to be used for the image scanning operation is performed when the second control program 31 is executed by the CPU 12 of the image scanner 10. Hereinafter, referring to FIGS. 10 to 12, an explanation will be provided of a flow of a process to be performed when the first control program 30 is executed by the CPU 12 of the image scanner 10. Further, referring to FIG. 13, an explanation will be provided of a flow of a process to be performed when the second control program 31 is executed by the CPU 12 of the image scanner 10.

Figure 10:
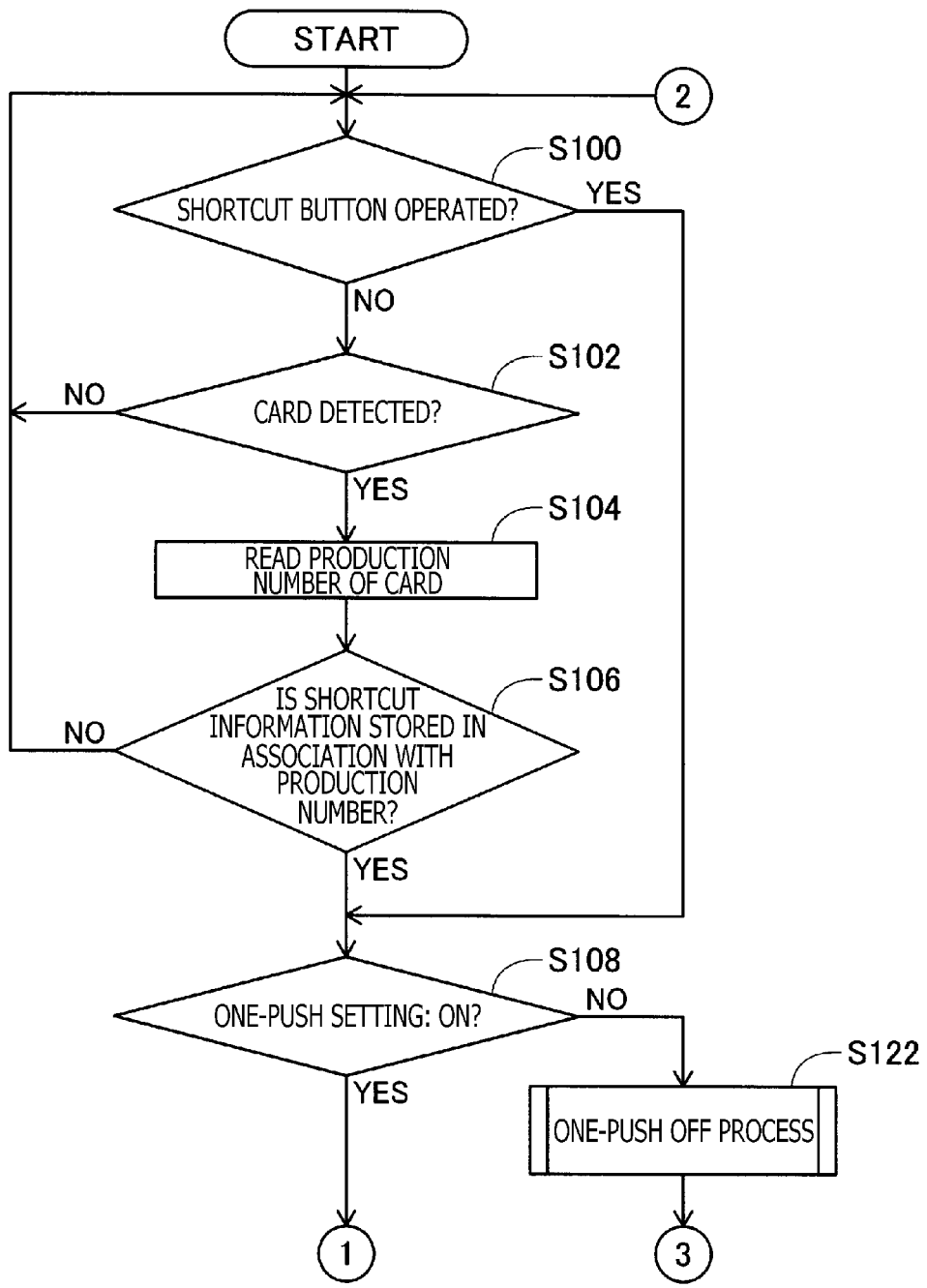
FIGS. 10 to 12 are flowcharts showing a procedure of a process to be performed when a first control program is executed by a CPU of the image scanner in the first illustrative embodiment according to one or more aspects of the present disclosure.
Figure 11:
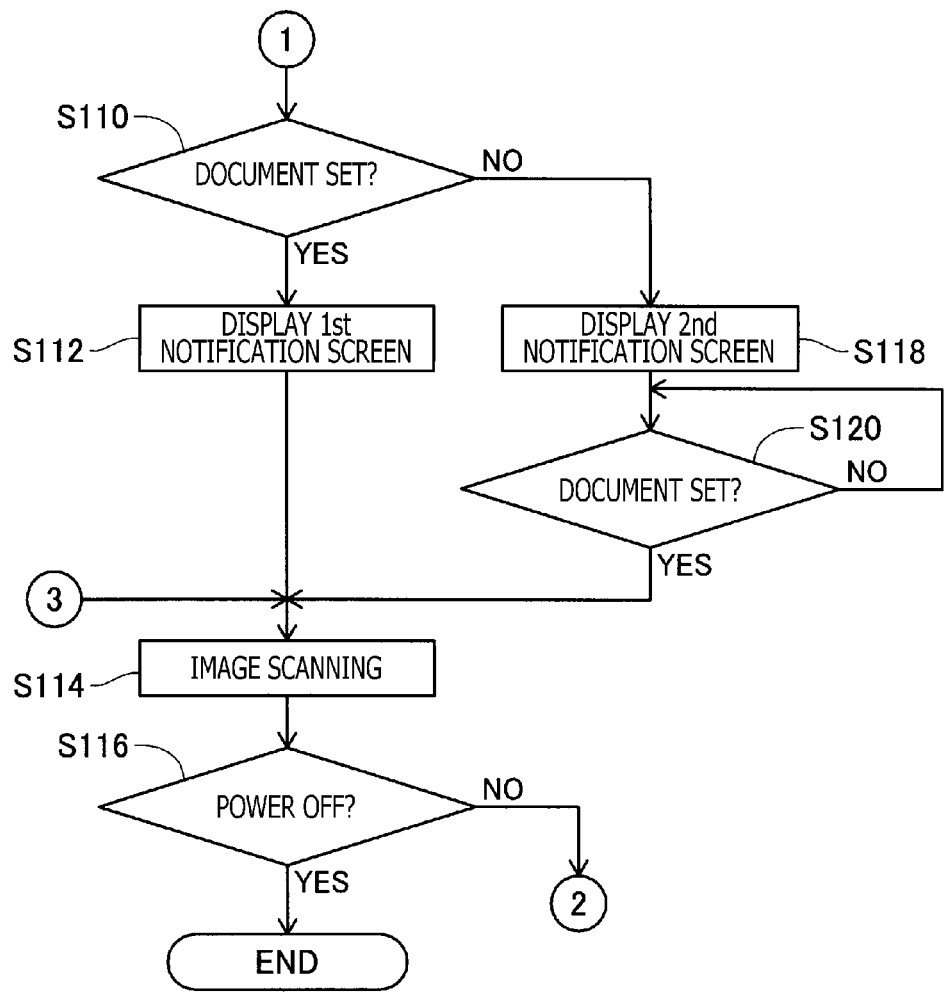

When executing the first control program 30, as shown in FIG. 10, the CPU 12 initially determines whether the registered shortcut button has been operated (S100). When determining that the shortcut button has not been operated (S100: No), the CPU 12 determines whether the registered card 40 has been detected (S102). In other words, in S102, the CPU 12 determines whether the registered card 40 has been brought in proximity to or in contact with the card reader 22. When determining that the card 40 has not been detected (S102: No), the CPU 12 goes back to S100.

Meanwhile, when determining that the card 40 has been detected (S102: Yes), the CPU 12 controls the card reader 22 to read the production number of the card 40 (S104). The CPU 12 determines whether there is shortcut information stored in the data storage area 32 in association with the read production number of the card 40 (S106). When determining that there is not shortcut information stored in the data storage area 32 in association with the production number of the card 40 (S106: No), the CPU 12 goes back to S100.

Meanwhile, when determining that there is shortcut information stored in the data storage area 32 in association with the production number of the card 40 (S106: Yes), the CPU 12 extracts the shortcut information. Further, the CPU 12 determines whether one-push setting included in the extracted shortcut information is set ON (S108). When determining that one-push setting included in the extracted shortcut information is set ON (S108: Yes), the CPU 12 determines whether there is a document set on the ADF (S110). When determining that there is a document set on the ADF (S110: Yes), the CPU 12 controls (e.g., transmits a control signal to) the display 16 to display the first notification screen 100 (S112).

The CPU 12 performs an image scanning operation based on the extracted shortcut information (S114). For instance, the CPU 12 transmits, to the image reading device 19, a control signal based on the extracted shortcut information. The image reading device 19 controls driving of the conveyance rollers and the image sensor based on the control signal. The CPU 12 determines whether the image scanner 10 is powered OFF (S116). When determining that the image scanner 10 is not powered OFF (S116: No), the CPU 12 goes back to S100. Meanwhile, when determining that the image scanner 10 is powered OFF (S116: Yes), the CPU 12 completes the process of the first control program 30.

When determining in S110 that there is not a document set on the ADF (S110: No), the CPU 12 controls (e.g., transmits a control signal to) the display 16 to display the second notification screen 102 (S118). The CPU 12 determines whether a document has been set on the ADF (S120). When determining that a document has not been set on the ADF (S120: NO), the CPU 12 repeatedly performs the operation in S120. Meanwhile, when determining that a document has been set on the ADF (S120: Yes), the CPU 12 goes to S114.

Figure 12:
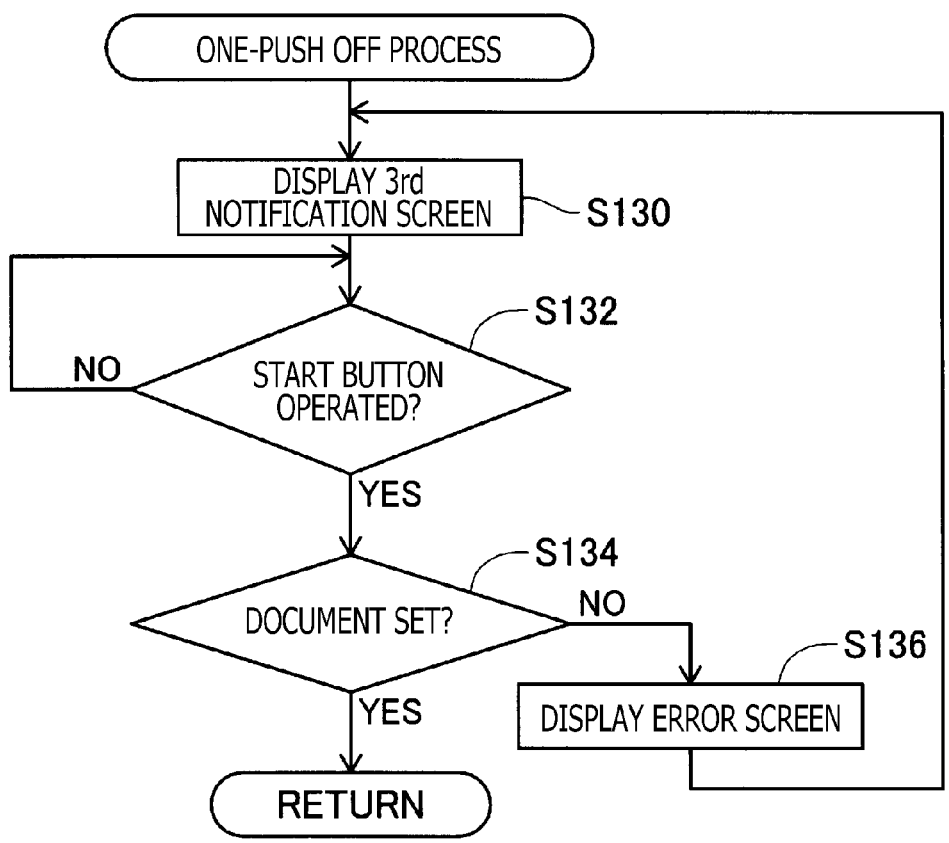

When determining that one-push setting included in the extracted shortcut information is set OFF (S108: No), the CPU 12 performs a one-push OFF process subroutine (S122). In the one-push OFF process subroutine, as shown in FIG. 12, the CPU 12 controls (e.g., transmits a control signal to) the display 16 to display the third notification screen 106 (S130). The CPU 12 determines whether the start button has been operated (S132). When determining that the start button has not been operated (S132: No), the CPU 12 repeatedly performs the operation in S132. Meanwhile, when determining that the start button has been operated (S132: Yes), the CPU 12 determines whether there is a document set on the ADF (S134). When determining that there is not a document set on the ADF (S134: No), the CPU 12 controls the display 16 to display an error screen (not shown) (S136). Thereafter, the CPU 12 goes back to S130. Meanwhile, when determining that there is a document set on the ADF (S134: Yes), the CPU 12 terminates the one-push process subroutine, and goes to S114 in the main routine.

When determining that the shortcut button has been operated (S100: Yes), the CPU 12 goes to S108. In this case, in S108, the CPU 12 extracts the shortcut information associated with the operated shortcut button. Further, in S108, the CPU 12 determines whether the one-push setting included in the extracted shortcut information is set ON.

Figure 13:
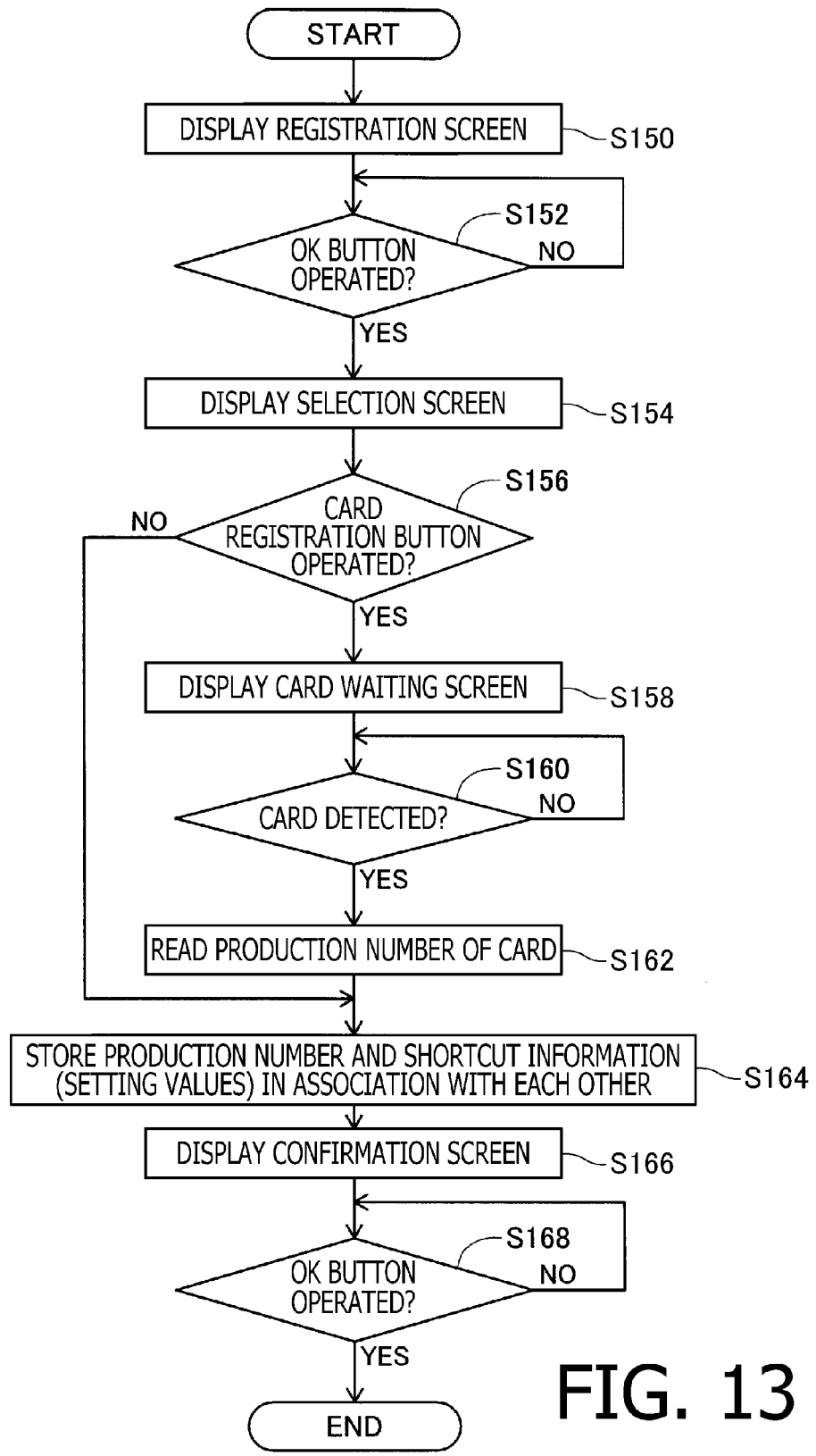
FIG. 13 is a flowchart showing a procedure of a process to be performed when a second control program is executed by the CPU of the image scanner in the first illustrative embodiment according to one or more aspects of the present disclosure.

The CPU 12 launches the second control program 31 in response to accepting an instruction to register a shortcut on a menu screen (not shown). As shown in FIG. 13, when the second control program 31 is launched, the CPU 12 controls (e.g., transmits a control signal to) the display 16 to display the registration screen 60 (S150). Subsequently, the CPU 12 determines whether the OK button 66 has been operated on the registration screen 60 (S152). When determining that the OK button 66 has not been operated on the registration screen 60 (S152: No), the CPU 12 repeatedly performs the operation in S152. Meanwhile, when determining that the OK button 66 has been operated on the registration screen 60 (S152: Yes), the CPU 12 controls (e.g., transmits a control signal to) the display 16 to display the selection screen 68 (S154). Then, the CPU 12 determines whether the card registration button 70 has been operated on the selection screen 68 (S156).

When determining that the card registration button 70 has been operated on the selection screen 68 (S156: Yes), the CPU 12 controls (e.g., transmits a control signal to) the display 16 to display the card waiting screen 76 (S158). The CPU 12 determines whether the card 40 has been detected, i.e., whether the card 40 has been brought in proximity to or in contact with the card reader 22 (S160). When determining that the card 40 has not been detected (S160: No), the CPU 12 repeatedly performs the operation in S160. Meanwhile, when determining that the card 40 has been detected (S160: Yes), the CPU 12 controls the card reader 22 to read the production number of the card 40 (S162).

The CPU 12 stores, into the data storage area 32, the read production number and the shortcut information input in the entry fields 62 on the registration screen 60 in association with each other (S164). Subsequently, the CPU 12 controls (e.g., transmits a control signal to) the display 16 to display the confirmation screen 81 (S166). The CPU 12 determines whether the OK button 82 has been operated on the confirmation screen 81 (S168). When determining that the OK button 82 has not been operated on the confirmation screen 81 (S168: No), the CPU 12 repeatedly performs the operation in S168. Meanwhile, when determining that the OK button 82 has been operated on the confirmation screen 81 (S168: Yes), the CPU 12 terminates the process based on the second control program 31.

In S156, when the card-less registration button 72, instead of the card registration button 70, has been operated on the selection screen 68 (S156: No), the CPU 12 goes to S164. In this case, in S164, the CPU 12 stores, into the data storage area 32, the operated shortcut button 88 and the shortcut information input in the entry fields 62 on the registration screen 60 in association with each other.

Second Illustrative Embodiment

Figure 14:
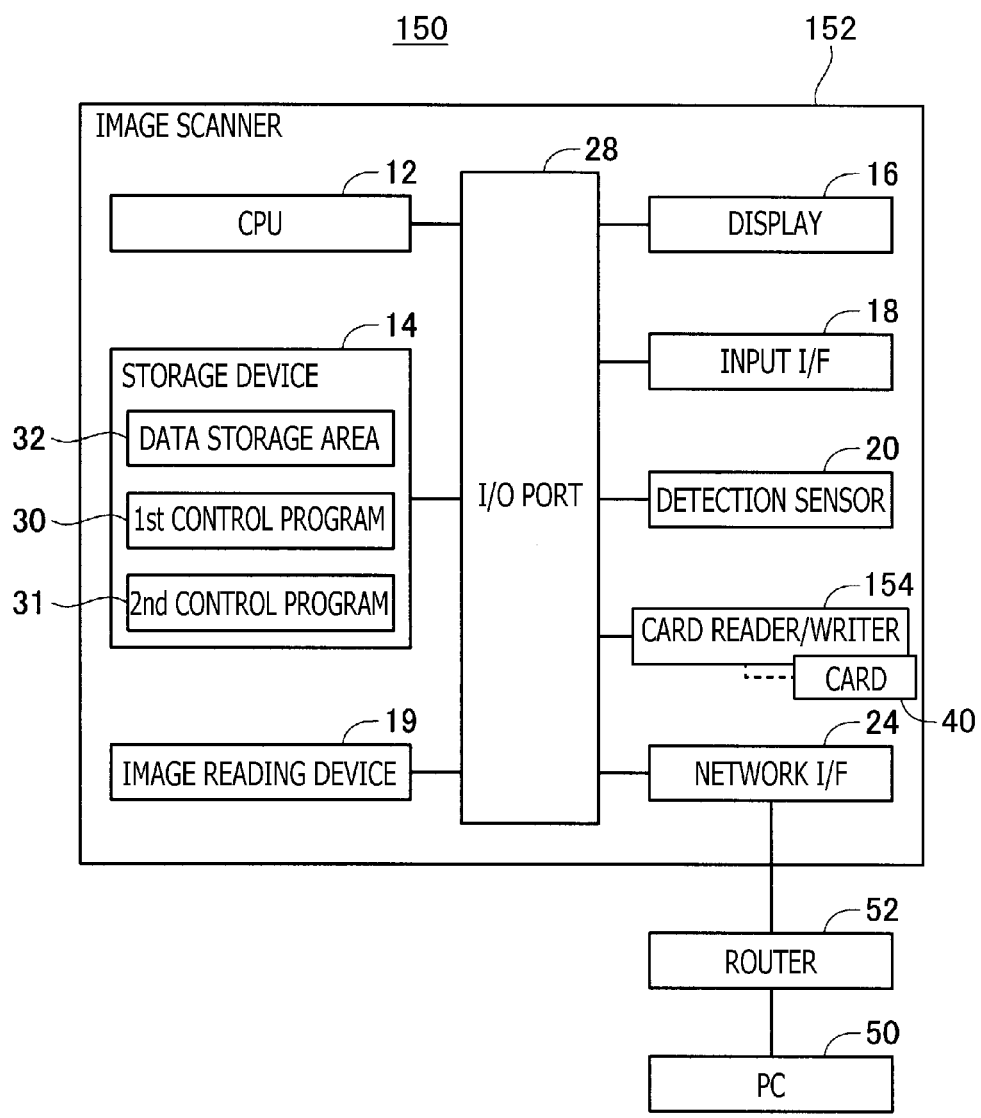
FIG. 14 is a block diagram showing a configuration of a communication system in a second illustrative embodiment according to one or more aspects of the present disclosure.

FIG. 14 is a block diagram of a communication system 150 in a second illustrative embodiment according to aspects of the present disclosure. The communication system 150 has the same configuration as that of the communication system 1 of the first illustrative embodiment, except for a card reader/writer 154 of an image scanner 152. It is noted that the image scanner 152 is an example of an image processing apparatus according to aspects of the present disclosure. The card reader/writer 154 is an example of a reader and an example of a writer according to aspects of the present disclosure. Hence, in the communication system 150, the same elements as those of the first illustrative embodiment will be provided with the same reference characters as those of the first illustrative embodiment.

In the communication system 150, the card reader/writer 154 of the image scanner 152 is configured to write various kinds of data into a card 40 and read data written in the card 40. Therefore, according to the communication system 150, in an image scanning operation using the card 40, a unique ID number generated by the image scanner 152 is used instead of a production number of the card 40. The unique ID number generated by the image scanner 152 is written into the card 40, and the image scanning operation is executed using the ID number. More specifically, when the card 40 is registered in the image scanner 152, the registration screen 60 shown in FIG. 2 is displayed on the display 16 in response to a button (not shown) for performing the registration of the card 40 being operated.

When the OK button 66 is operated after shortcut information is input in the entry fields 62 on the registration screen 60, the selection screen 68 shown in FIG. 3 is displayed on the display 16. When the card registration button 70 is operated on the selection screen 68, the card waiting screen 76 shown in FIG. 4 is displayed on the display 16. Before the card waiting screen 76 is displayed, the CPU 12 generates the unique ID number. When the user brings the card 40 in proximity to or in contact with the card reader/writer 154 in accordance with the message displayed on the card waiting screen 76, the ID number is written into the card 40. The ID number and the shortcut information input in the entry fields 62 on the registration screen 60 are stored into the data storage area 32 in association with each other. Thereafter, the confirmation screen 81 shown in FIG. 5 is displayed on the display 16. When the OK button 82 is operated on the confirmation screen 81, the registration of the card 40 is completed.

When the registered card 40 is brought in proximity to or in contact with the card reader/writer 154, the ID number written in the card 40 is read by the card reader/writer 154. The shortcut information, stored in the data storage area 32 in association with the read ID number, is extracted. Since operations to be executed after the extraction of the shortcut information are substantially the same as those in the first illustrative embodiment, explanations of the operations will be omitted. Nonetheless, in the image scanner 152 of the second illustrative embodiment as well, it is possible to execute the image scanning operation using the card 40, in the same manner as executed by the image scanner 10 of the first illustrative embodiment.

In the aforementioned first illustrative embodiment, the image scanner 10 executes the image scanning operation using the production number of the card 40. In the second illustrative embodiment, the image scanner 152 generates the unique ID number and executes the image scanning operation using the ID number. The production number of the card 40 is a number set for each individual card by a manufacturing company of the card 40. Therefore, there is little possibility that there are two or more cards of the same production number. However, for instance, when a huge number of cards are issued, there might be a case, with very low possibility, where there are two or more cards of the same production number. In such a case, confidentiality of registered information might be impaired. On the other hand, in the case of the unique ID number generated by the image scanner 152, when a card-specific ID number is written into each individual card, it is possible to enhance the possibility that only a single card exists with the same ID number written therein. Therefore, according to the image scanner 152 of the second illustrative embodiment, it is possible to certainly secure the confidentiality of registered information.

Figure 15:
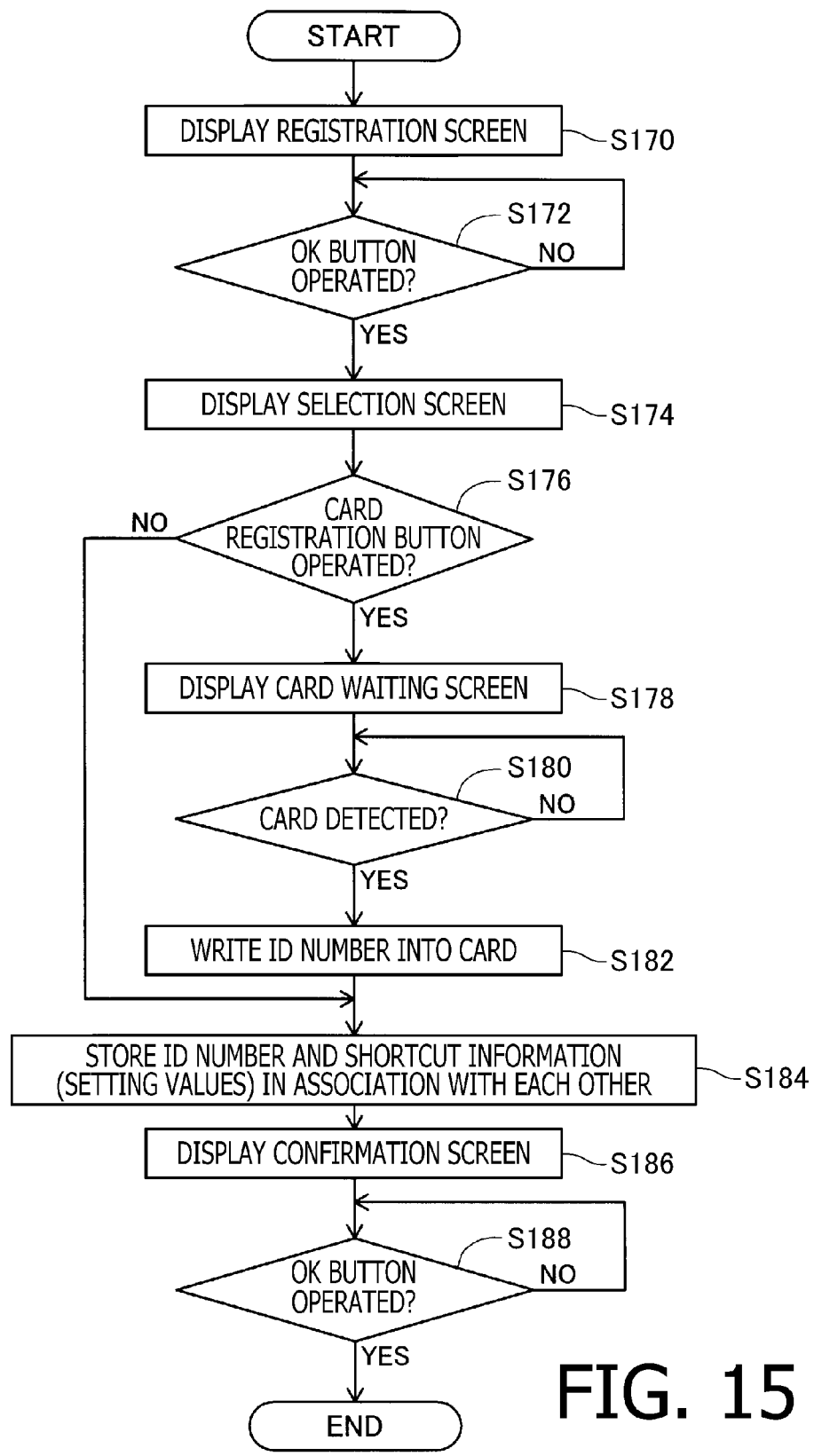
FIG. 15 is a flowchart showing a procedure of a process to be performed when a second control program is executed by a CPU of an image scanner included in the communication system in the second illustrative embodiment according to one or more aspects of the present disclosure.

The aforementioned registration of the card 40 is performed when the second control program 31 is executed by the CPU 12 of the image scanner 152. Hereinafter, referring to FIG. 15, an explanation will be provided of a flow of a process to be performed when the second control program 31 is executed by the CPU 12 of the image scanner 152. In this respect, nonetheless, the process shown in FIG. 15 has many operations in common with the process shown in FIG. 13. Therefore, a simple explanation will be provided of each operation in common with the process shown in FIG. 13.

When the second control program 31 is launched, the CPU 12 executes operations in S170 to S180 in the same manner as executed in S150 to S160 shown in FIG. 13. Then, when determining that the card 40 has been detected (S180: Yes), the CPU 12 generates the unique ID number and writes the ID number into the card 40 (S182). The CPU 12 stores, into the data storage area 32, the ID number and the shortcut information input in the entry fields 62 on the registration screen 60 in association with each other (S184). Subsequently, the CPU 12 executes operations in S186 and S188 in the same manner as executed in S166 and S168 shown in FIG. 13, respectively. Thereafter, the CPU 12 terminates the process based on the second control program 31.

Third Illustrative Embodiment

A communication system 150 of a third illustrative embodiment has substantially the same configuration as the communication system 150 of the second illustrative embodiment. Therefore, the configuration of the communication system 150 of the third illustrative embodiment will not be shown in any drawings or be described.

In the image scanner 10 of the aforementioned first illustrative embodiment, the production number of the card 40 and the shortcut information are stored into the data storage area 32 in association with each other, and the shortcut information is extracted using the production number of the card 40. Further, in the image scanner 152 of the aforementioned second illustrative embodiment, the ID number and the shortcut information are stored into the data storage area 32 in association with each other, and the shortcut information is extracted using the ID number. In the communication system 150 of the third illustrative embodiment, shortcut information is written in a card 40, and the shortcut information is read by the card reader/writer 154. Thereby, an image scanning operation is executed in accordance with the shortcut information.

Specifically, when registration for the card 40 is performed by the image scanner 152, the registration screen 60 shown in FIG. 2 is displayed on the display 16 in response to a button (not shown) for performing the registration for the card 40 being operated. When the OK button 66 is operated after the shortcut information is input in the entry fields 62 on the registration screen 60, a card waiting screen 160 is displayed on the display 16, as shown in FIG. 16.

On the card waiting screen 160, the shortcut information input in the entry fields 62 on the registration screen 60, a message that prompts the user to bring the card 40 in proximity to or in contact with the card reader/writer 154 in order for the shortcut information to be written into the card 40, and a cancel button 162 are displayed. The user confirms the message on the card waiting screen 160 and then brings the card 40 for registration in proximity to or in contact with the card reader/writer 154. Thereby, the shortcut information input in the entry fields 62 on the registration screen 60 is written into the card 40 for registration. When the shortcut information is completely written into the card 40, a confirmation screen 166 is displayed on the display 16, as shown in FIG. 17. On the confirmation screen 166, the shortcut information registered in the card 40 and an OK button 168 are displayed. When the OK button 168 is operated, the registration for the card 40 is completed.

When the card 40, for which the registration has been completed, is brought in proximity to or in contact with the card reader/writer 154, the shortcut information written in the card 40 is read by the card reader/writer 154. An image scanning operation is executed using the shortcut information, in the same manner as executed by the image scanner 10 of the first illustrative embodiment and by the image scanner 152 of the second illustrative embodiment. Thus, in the image scanner 152 of the third illustrative embodiment as well, it is possible to execute the image scanning operation using the card 40, in the same manner as executed by the image scanner 10 of the first illustrative embodiment and by the image scanner 152 of the second illustrative embodiment.

In the image scanner 10 of the first illustrative embodiment, the production number of the card 40 and the shortcut information are registered in association with each other. In order to execute the image scanning operation using the card 40 in the first illustrative embodiment, the production number and the shortcut information need to be registered in each intended image scanner. Further, in the image scanner 152 of the second illustrative embodiment, the ID number and the shortcut information are registered in association with each other. In order to execute the image scanning operation using the card 40 in the second illustrative embodiment, the ID number and the shortcut information need to be registered in each intended image scanner. On the contrary, according to the third illustrative embodiment, the shortcut information is not registered in the image scanner 152 but registered in the card 40. In the image scanner 152 of the third illustrative embodiment, it is possible to execute the image scanning operation using the card 40 with the shortcut information registered therein, without having to register card-specific information (such as a production number or an ID number) in the image scanner 152. Thereby, it is possible to achieve a versatile scanning operation.

The image scanning operation using the card 40 with the shortcut information registered therein as described above is performed when the first control program 30 is executed by the CPU 12 of the image scanner 152. Further, the aforementioned registration for the card 40 is performed when the second control program 31 is executed by the CPU 12 of the image scanner 152. Hereinafter, referring to FIGS. 18 and 19, an explanation will be provided of a flow of a process to be performed when the first control program 30 is executed by the CPU 12 of the image scanner 152. Further, referring to FIG. 20, an explanation will be provided of a flow of a process to be performed when the second control program 31 is executed by the CPU 12 of the image scanner 152. In this respect, nonetheless, the process shown in FIGS. 18 and 19 has many operations in common with the process shown in FIGS. 10 and 11, and the process shown in FIG. 20 has many operations in common with the process shown in FIG. 13. Therefore, a simple explanation will be provided of each operation in common with the processes of the first illustrative embodiment.

When the first control program 30 is launched, the CPU 12 executes operations in S200 and S202 in the same manner as executed in S100 and S102 shown in FIG. 10. Then, when determining that the card 40 has been detected (S202: Yes), the CPU 12 controls the card reader/writer 154 to read data from the detected card 40 and decodes the read data (S204). The CPU 12 determines whether the data has successfully been decoded (S206). When determining that the data has not successfully been decoded (S206: No), the CPU 12 goes back to S200. Meanwhile, when determining that the data has successfully been decoded (S206: Yes), the CPU 12 executes operations in S208 to S222 in the same manner as executed in S108 to S122 shown in FIG. 10. Thereafter, the CPU 12 terminates the process based on the first control program 30. It is noted that the shortcut information to be used in the process shown in FIG. 20 is acquired through the decoding of the data read out from the card 40.

When the second control program 31 is launched, the CPU 12 executes operations in S230 and S232 in the same manner as executed in S150 and S152 shown in FIG. 13. When determining in S232 that the OK button 66 has been operated on the registration screen 60 (S232: Yes), the CPU 12 controls the display 16 to display the card waiting screen 160 (S234). The CPU 12 determines whether the card 40 has been detected, i.e., whether the card 40 has been brought in proximity to or in contact with the card reader/writer 154 (S236). When determining that the card 40 has not been detected (S236: No), the CPU 12 repeatedly performs the operation in S236. Meanwhile, when determining that the card 40 has been detected (S236: Yes), the CPU 12 controls the card reader/writer 154 to write into the card 40 the shortcut information input in the entry fields 62 on the registration screen 60 (S238). The CPU 12 executes operations in S240 and S242 in the same manner as executed in S166 and S168 shown in FIG. 13. Thereafter, the CPU 12 terminates the process based on the second control program 31.

Hereinabove, the illustrative embodiments according to aspects of the present disclosure have been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modification]

In the aforementioned illustrative embodiments, the card 40 is registered in association with the shortcut information in response to the card registration button 70 being operated on the selection screen 68. Further, the shortcut button 88 is registered in association with the shortcut information in response to the card-less registration button 72 being operated on the selection screen 68. Instead, the card 40 and the shortcut button 88 may concurrently be registered in association with the shortcut information in response to the card registration button 70 being operated. Namely, by a user operation of the card registration button 70, the shortcut information input on the registration screen 60, the production number of the card 40 that has been read by the card reader 22, and the information on the shortcut button 88 may be stored in association with each other. Thereby, no matter which one, of the card 40 and the shortcut button 88 registered in response to the user operation of the card registration button 70, is used to execute the image scanning operation, it is possible to execute the image scanning operation under the same condition. Additionally, when the card 40 and the shortcut button 88 are concurrently registered in response to the card registration button 70 being operated, the shortcut button 88 may only be registered in response to the card-less registration button 72.

In the aforementioned illustrative embodiments, the image scanning operation is executed using the card 40. Nonetheless, instead, a printing operation or a copy operation may be executed using the card 40. Shortcut information for a printing operation or a copy operation to be executed using the card 40 may include information for specifying a size of printing sheets, information for specifying one of monochrome printing and color printing, information on a one-push setting, and information for determining whether printing is to be performed on printing sheets set in a feed tray or printing sheets set on a manual feed tray.

When information that printing is to be performed on printing sheets set on the manual feed tray is set as shortcut information for the printing operation or the copy operation, and printing sheets are set on the manual feed tray, the printing operation or the copy operation may be performed in response to detection of the card 40. Meanwhile, when information that printing is to be performed on printing sheets set on the manual feed tray is set as shortcut information for the printing operation or the copy operation, and there is no printing sheet set on the manual feed tray, a screen that is substantially equivalent to the second notification screen 102 shown in FIG. 8 may be displayed on the display 16 after detection of the card 40. The screen may display thereon shortcut information for the printing operation and a message that the printing operation will be executed immediately after printing sheets are set on the manual feed tray.

In the aforementioned illustrative embodiments, in a case where, when the card 40 is detected, the one-push setting is set ON, and there is not a document set on the ADF, the shortcut information for the image scanning operation is displayed on the display 16. Thereafter, the image scanning operation is started immediately after a document is set on the ADF. Nonetheless, the image scanning operation may be started in response to acceptance of a user operation after the shortcut information is displayed on the display 16 and then a document is set on the ADF. Thereby, it is possible to prevent a sheet jam in the ADF from being caused when the image scanning operation is started under an undesired condition, e.g., a situation where a document is set inclined on the ADF.

When a document is not set (S134: No) during execution of the one-push OFF process (S122 or S222) in the aforementioned illustrative embodiments, the second notification screen 102, instead of the error screen (S136), may be displayed in the same manner as executed in S118. Thereafter, a determination may be made as to whether a document has been set on the ADF in the same manner as executed in S120. When it is determined that a document has been set on the ADF, the image scanning operation may be performed in the same manner as executed in S114.

In the aforementioned illustrative embodiments, the shortcut information includes the information on the one-push setting. Nonetheless, the shortcut information may not include the information on the one-push setting. In other words, the image scanner may be configured to only perform the same operations as when the one-push setting is set ON in the aforementioned illustrative embodiments. Alternatively, the image scanner may be configured to only perform the same operations as when the one-push setting is set OFF in the aforementioned illustrative embodiments.

In the aforementioned illustrative embodiments, the display 16 has been shown as an example of the display according to aspects of the present disclosure. Nonetheless, any other display device such as a light emitting diode (hereinafter referred to as an "LED") may be used in addition to or instead of the display 16. In this case, the CPU 12 may show predetermined kinds of display on the LED in addition to or instead of notification of predetermined information via the first notification screen 100, the second notification screen 102, and the third notification screen 106.

In the aforementioned illustrative embodiments, image scanning is performed in an ADF method. Nonetheless, image scanning may be performed in a flatbed (hereinafter referred to as "FB") method. In this case, a determination as to whether a document has been set may be made based on image data acquired by the image sensor included in the image reading device 19 or based on detection signal from a detection sensor disposed at the FB.

In the aforementioned illustrative embodiments, the card 40 with the IC chip incorporated therein is employed as a recording medium for recording identification information. Nonetheless, a mobile terminal device such as a smartphone or a tablet computer may be employed. Further, the identification information associated with the shortcut information may be read via communication other than the near-field wireless communication. For instance, the identification information may be acquired as a character string by scanning a barcode with the image sensor and decoding the scanned barcode.

In the aforementioned illustrative embodiments, various screens (e.g., the registration screen 60, the selection screen 68, the card waiting screen 76, the confirmation screen 81, the shortcut button selection screen 86, the first notification screen 100, the second notification screen 102, the third notification screen 106, the card waiting screen 160, and the confirmation screen 166) are displayed in the display 16 of the image scanner 10 (or 152). Additionally or alternatively, the various screens may be displayed in another display connected to the PC 50. For example, in S118, the CPU 12 may transmit a control signal via the network I/F 24 to the PC 50 to cause the other display, connected to the PC 50, to display the second notification screen 102. Similarly, the CPU 12 may transmit a control signal via the network I/F 24 to the PC 50 to cause the other display, connected to the PC 50, to display the various screens. In this configuration, the image scanner 10 (or 152) may not include the display 16.

In the aforementioned illustrative embodiments, examples have been described in which the CPU 12 performs the processes shown in FIGS. 10 to 13, FIG. 15, and FIGS. 18 to 20. Nonetheless, the processes may be performed by one or more application specific integrated circuits (hereinafter referred to as "ASICs") or one or more logic integrated circuits. Further, the processes may be performed by one or more CPUs, one or more ASICs, and one or more logic integrated circuits in cooperation with each other.

What is claimed is:

1. An image processing apparatus comprising:
    a display;
    a sensor configured to detect a document set on the image processing apparatus;
    an image processing device configured to perform an image processing operation of processing an image of the document;
    a reader configured to read registration information from a recording medium positioned in proximity to or in contact with the reader, the registration information including at least one of identification information for the recording medium and setting information for the image processing operation; and
    a controller configured to:
        in response to the recording medium being brought in proximity to or in contact with the reader, control the reader to read the registration information from the recording medium;
        in response to the registration information being read by the reader, acquire the setting information based on the read registration information;
        in response to acquiring the setting information, determine whether the document is set on the image processing apparatus, based on a detection signal from the sensor;
        in response to determining that the document is set on the image processing apparatus, control the image processing device to perform the image processing operation in accordance with the acquired setting information; and
        when determining that the document is not set on the image processing apparatus, control the display to display a screen corresponding to the acquired setting information.

2. The image processing apparatus according to claim 1, further comprising:
    a storage device configured to store the setting information and the identification information in association with each other; and wherein the image processing device is configured to perform an image reading operation of reading the image of the document, and wherein the controller is further configured to:
- control the reader to read the identification information of the registration information from the recording medium;
- in response to the identification information being read by the reader, acquire, from the storage device, the setting information associated with the read identification information;
- in response to acquiring the setting information, determine whether the document is set on the image processing apparatus, based on the detection signal from the sensor;
- when determining that the document is set on the image processing apparatus, control the image processing device to perform the image reading operation in accordance with the acquired setting information; and
- when determining that the document is not set on the image processing apparatus, control the display to display the acquired setting information.

3. The image processing apparatus according to claim 2, wherein the controller is further configured to:
- when determining that the document is not set on the image processing apparatus, perform:
  - controlling the display to display the acquired setting information;
  - after the setting information is displayed on the display, determining whether the document is set on the image processing apparatus, based on the detection signal from the sensor; and
  - when determining that the document is set on the image processing apparatus, controlling the image processing device to perform the image reading operation in accordance with the acquired setting information.

4. The image processing apparatus according to claim 2, further comprising an operation device configured to accept an operation and output a signal corresponding to the accepted operation,
wherein the setting information includes an operation mode setting representing whether a predetermined operation mode is active, and
wherein the controller is further configured to:
- in response to acquiring the setting information, determine whether the operation mode setting included in the acquired setting information represents that the predetermined operation mode is active;
- when determining that the operation mode setting does not represent that the predetermined operation mode is active, control the image processing device to perform the image reading operation in accordance with the acquired setting information in response to receiving from the operation device a confirmation signal representing confirmation of the setting information associated with the identification information; and
- when determining that the operation mode setting information represents that the predetermined operation mode is active, control the image processing device to perform the image reading operation in accordance with the acquired setting information, without receiving the confirmation signal from the operation device.

5. The image processing apparatus according to claim 2, further comprising an operation device configured to accept an operation and output a signal corresponding to the accepted operation,
wherein the controller is further configured to:
- control the display to display an icon, the icon being associated with the setting information stored in the storage device in association with the identification information; and
- when receiving from the operation device a selection signal representing selection of the icon displayed on the display, control the image processing device to perform the image reading operation in accordance with the setting information associated with the selected icon.

6. The image processing apparatus according to claim 5, wherein the setting information includes an operation mode setting that specifies one of:
- a first mode in which the controller controls the image processing device to perform the image reading operation in accordance with the setting information associated with the selected icon, in response to receiving from the operation device a confirmation signal representing confirmation of the setting information associated with the selected icon, after receiving from the operation device the selection signal representing selection of the icon displayed on the display; and
- a second mode in which the controller controls the image processing device to perform the image reading operation in accordance with the setting information associated with the selected icon, in response to receiving from the operation device the selection signal representing selection of the icon displayed on the display, without receiving the confirmation signal.

7. The image processing apparatus according to claim 2, wherein the controller is further configured to store, into the storage device, the identification information read by the reader and the setting information for the image reading operation in association with each other.

8. The image processing apparatus according to claim 2, further comprising a writer configured to write the identification information into the recording medium,
wherein the controller is further configured to:
- control the writer to write the identification information into the recording medium;
- store, into the storage device, the identification information written by the writer and the setting information for the image reading operation in association with each other.

9. The image processing apparatus according to claim 1, wherein the image processing device is configured to perform an image reading operation of reading the image of the document, and
wherein the controller is further configured to:
- control the reader to read the registration information from the recording medium and acquiring the setting information from the read registration information;
- in response to acquiring the setting information from the registration information, determine whether the document is set on the image processing apparatus, based on the detection signal from the sensor;
- when determining that the document is set on the image processing apparatus, control the image processing device to perform the image reading operation in accordance with the acquired setting information; and when determining that the document is not set on the image processing apparatus, perform:

controlling the display to display the acquired setting information;

after the setting information is displayed on the display, determining whether the document is set on the image processing apparatus; and in response to determining that the document is set on the image processing apparatus, controlling the image processing device to perform the image reading operation in accordance with the acquired setting information.

10. The image processing apparatus according to claim 1, wherein the reader is configured to read the registration information from the recording medium via near-field wireless communication in response to the recording medium being brought in proximity to or in contact with the reader.

11. The image processing apparatus according to claim 1, wherein the identification information is a non-rewritable ID number specific to the recording medium.

12. The image processing apparatus according to claim 1, wherein the controller comprises:
   a processor; and
   a memory storing processor-executable instructions configured to, when executed by the processor, cause the processor to:
   in response to the recording medium being brought in proximity to or in contact with the reader, control the reader to read the registration information from the recording medium;
   in response to the registration information being read by the reader, acquire the setting information based on the read registration information;
   in response to acquiring the setting information, determine whether the document is set on the image processing apparatus, based on the detection signal from the sensor; and
   in response to determining that the document is set on the image processing apparatus, control the image processing device to perform the image processing operation in accordance with the acquired setting information.

13. A method adapted to be implemented on a processor coupled with an image processing apparatus comprising a sensor, an image processing device, and a reader, the method comprising:
   in response to a recording medium being brought in proximity to or in contact with the reader, controlling the reader to read registration information from the recording medium via near-field wireless communication, the registration information including at least one of identification information for the recording medium and setting information for an image processing operation performed by the image processing device;
   in response to the registration information being read by the reader, acquiring the setting information based on the read registration information;
   in response to acquiring the setting information, determining whether a document is set on the image processing apparatus, based on a detection signal from the sensor configured to detect the document set on the image processing apparatus;
   in response to determining that the document is set on the image processing apparatus, controlling the image processing device to perform the image processing operation of processing an image of the document in accordance with the acquired setting information; and
   when determining that the document is not set on the image processing apparatus, transmitting a control signal to display a screen corresponding to the acquired setting information.

14. The method according to claim 13, further comprising:
   controlling the reader to read the identification information of the registration information from the recording medium;
   in response to the identification information being read by the reader, acquiring the setting information from a storage device storing the setting information and the identification information in association with each other;
   in response to acquiring the setting information from the storage device, determining whether the document is set on the image processing apparatus, based on the detection signal from the sensor;
   when determining that the document is set on the image processing apparatus, controlling the image processing device to perform an image reading operation of reading the image of the document in accordance with the acquired setting information; and
   when determining that the document is not set on the image processing apparatus, transmitting a control signal to display the acquired setting information.

15. The method according to claim 13, further comprising:
   controlling the reader to read the registration information from the recording medium and acquiring the setting information from the read registration information;
   in response to acquiring the setting information from the registration information, determining whether the document is set on the image processing apparatus, based on the detection signal from the sensor;
   when determining that the document is set on the image processing apparatus, controlling the image processing device to perform an image reading operation of reading the image of the document in accordance with the acquired setting information; and
   when determining that the document is not set on the image processing apparatus, performing:
      transmitting a control signal to display the acquired setting information;
      after transmitting the control signal to display the acquired setting information, determining whether the document is set on the image processing apparatus; and
      in response to determining that the document is set on the image processing apparatus, controlling the image processing device to perform the image reading operation in accordance with the acquired setting information.

16. A non-transitory computer-readable medium storing computer-readable instructions that are executable by a processor coupled with an image processing apparatus comprising a sensor, an image processing device, and a reader, the instructions being configured to, when executed by the processor, cause the processor to:
   in response to a recording medium being brought in proximity to or in contact with the reader, control the reader to read registration information from the recording medium via near-field wireless communication, the registration information including at least one of identification information for the recording medium and setting information for an image processing operation performed by the image processing device;

in response to the registration information being read by the reader, acquire the setting information based on the read registration information;

in response to acquiring the setting information, determine whether a document is set on the image processing apparatus, based on a detection signal from the sensor configured to detect the document set on the image processing apparatus;

in response to determining that the document is set on the image processing apparatus, control the image processing device to perform the image processing operation of processing an image of the document in accordance with the acquired setting information; and when determining that the document is not set on the image processing apparatus, transmit a control signal to display a screen corresponding to the acquired setting information.

17. The non-transitory computer-readable medium according to claim 16, wherein the instructions are further configured to, when executed by the processor, cause the processor to:

control the reader to read the identification information of the registration information from the recording medium;

in response to the identification information being read by the reader, acquire the setting information from a storage device storing the setting information and the identification information in association with each other;

in response to acquiring the setting information from the storage device, determine whether the document is set on the image processing apparatus, based on the detection signal from the sensor;

when determining that the document is set on the image processing apparatus, control the image processing device to perform an image reading operation of reading the image of the document in accordance with the acquired setting information; and when determining that the document is not set on the image processing apparatus, transmit a control signal to display the acquired setting information.

18. The non-transitory computer-readable medium according to claim 16, wherein the instructions are further configured to, when executed by the processor, cause the processor to:

control the reader to read the registration information from the recording medium and acquiring the setting information from the read registration information;

in response to acquiring the setting information from the registration information, determine whether the document is set on the image processing apparatus, based on the detection signal from the sensor;

when determining that the document is set on the image processing apparatus, control the image processing unit to perform an image reading operation of reading the image of the document in accordance with the acquired setting information; and when determining that the document is not set on the image processing apparatus, perform:

transmitting a control signal to display the acquired setting information;

after transmitting the control signal to display the acquired setting information, determining whether the document is set on the image processing apparatus; and in response to determining that the document is set on the image processing apparatus, controlling the image processing device to perform the image reading operation in accordance with the acquired setting information.

* * * * *